(12) United States Patent
Nagao et al.

(10) Patent No.: US 8,160,430 B2
(45) Date of Patent: Apr. 17, 2012

(54) RECORDING APPARATUS AND RECORDING METHOD

(75) Inventors: Kenichiro Nagao, Chiba (JP); Hiroki Shiina, Kanagawa (JP); Tetsuhiro Maeda, Kanagawa (JP)

(73) Assignee: Sony Corporation (JP)

( * ) Notice: Subject to any disclaimer, the term of this patent is extended or adjusted under 35 U.S.C. 154(b) by 1758 days.

(21) Appl. No.: 11/411,083

(22) Filed: Apr. 25, 2006

(65) Prior Publication Data

US 2006/0263047 A1 Nov. 23, 2006

(30) Foreign Application Priority Data

Apr. 25, 2005 (JP) ................. P2005-126841

(51) Int. Cl.
*H04N 5/84* (2006.01)
(52) U.S. Cl. .............. 386/332; 386/331; 386/338
(58) Field of Classification Search ............. 386/95, 386/125–126
See application file for complete search history.

(56) References Cited

U.S. PATENT DOCUMENTS

| | | |
|---|---|---|
| 6,661,437 B1 | 12/2003 | Miller et al. |
| 7,054,540 B2 * | 5/2006 | Nomura et al. ........... 386/283 |
| 7,057,986 B2 * | 6/2006 | Fukuchi .................. 369/47.31 |
| 2002/0088011 A1 | 7/2002 | Lamkin et al. |
| 2003/0210895 A1 | 11/2003 | Aridome et al. |
| 2004/0177319 A1 | 9/2004 | Horn |

FOREIGN PATENT DOCUMENTS

| | | |
|---|---|---|
| JP | 2003-085944 A | 3/2003 |
| JP | 2003-331526 | 11/2003 |
| JP | 2005-079823 A | 3/2005 |
| WO | WO-01/15168 A1 | 3/2001 |

* cited by examiner

*Primary Examiner* — Jamie Atala
(74) *Attorney, Agent, or Firm* — Lerner, David, Littenberg, Krumholz & Mentlik, LLP (57) ABSTRACT

A recording apparatus includes a screen information generation unit and a recording control unit. When again generating screen information of a recording medium recorded with plural image data, the screen information on which a screen for selecting the plural image data is based, and a recording state of the image data when the screen information was generated, the screen information generation unit selects a range of the screen information necessary to be rewritten in accordance with a recording state of image data in the recording medium when previous screen information was generated and a recording state of image data in the recording medium at a present time, and updates only the selected range of the screen information. The recording control unit records screen information generated by the screen information generation unit in the recording medium.

8 Claims, 10 Drawing Sheets

FIG. 9A | LEAD IN | FS | | | VTS#1 | VTS#2 | VTS#3 | ... | VTS#n |

⇩ FINALIZATION

FIG. 9B | LEAD IN | FS | VMGI | VMGM_VOBS | VTS#1 | VTS#2 | VTS#3 | ... | VTS#n | LEAD OUT |

⇩ UNFINALIZATION

FIG. 9C | LEAD IN | FS | | | VTS#1 | VTS#2 | VTS#3 | ... | VTS#n |

⇩ ADDITIONAL RECORDING

FIG. 9D | LEAD IN | FS | | | VTS#1 | VTS#2 | VTS#3 | ... | VTS#n | VTS#n+1 |

⇩ REFINALIZATION

FIG. 9E | LEAD IN | FS | VMGI | VMGM_VOBS | VTS#1 | VTS#2 | VTS#3 | ... | VTS#n | VTS#n+1 | LEAD OUT |

RELATED ART

FIG. 10

RELATED ART

RECORDING APPARATUS AND RECORDING METHOD

CROSS-REFERENCE TO RELATED APPLICATIONS

The present application claims priority from Japanese Patent Application No. JP 2005-126841 filed on Apr. 25, 2005, the disclosure of which is hereby incorporated by reference herein.

BACKGROUND OF THE INVENTION

The present invention relates to a recording apparatus for a recording medium which records a plurality of image data, and to a recording method.

A format called DVD-Video is known as a format for recording moving images in a DVD disc. According to DVD-Video, a lead-in, a file system (FS), Video Manager Information (VMGI), a Video Object Set for Video Manager Menu (VMGM_VOBS), Video Title Sets (VTS), and a lead-out are recorded in this order from the top. Of these, VMGI is playback control information for a whole DVD disc, and VMGM_VOBS is the basis of a menu screen.

Figure 9A:
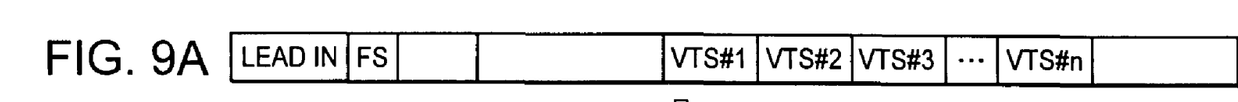
FIGS. 9A to 9E are schematic diagrams showing a change in recorded data in DVD disc during a related-art finalizing process.

VMGI, VMGM-VOBS and lead-out are generated when a recording DVD disc such as DVD-R/RW and DVD+R/RW is finalized. A finalizing process will be described with reference to FIGS. 9A to 9E. As shown in FIG. 9A, a lead-in, a file system and a plurality of VTSs are recorded in a DVD disc not yet finalized.

Figure 9B:
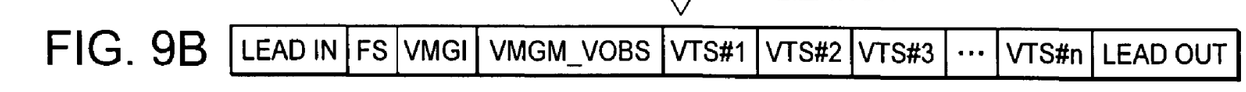
Figure 10:
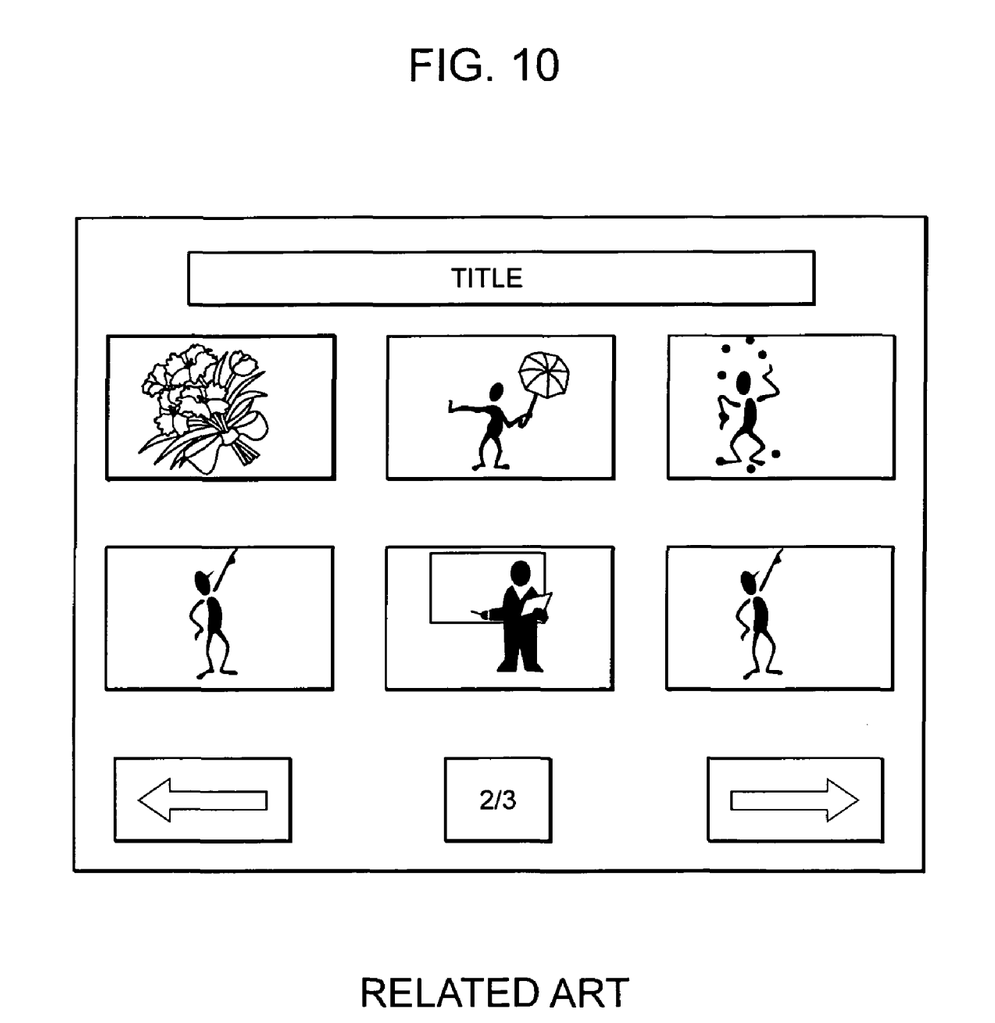
FIG. 10 is a schematic diagram showing an example of a menu screen.

As shown in FIG. 9B, in a finalizing process for a DVD disc, VMGI and VMGM-VOBS are generated and recorded in the DVD disc. When the VMGM_VOBS is generated, first, a picture representative of the contents of each VTS is selected from the plurality of VTSs. The representative pictures are resized to form still image thumbnails. This operation is repeated as many times as the number of scenes to form a menu screen. The menu screen of bit map data is encoded again into a video stream. A packetized video stream is herein called a video pack. In the finalizing process, a menu screen with still image thumbnails attached thereto is formed. Arrangement of a menu screen is determined beforehand. In an example shown in FIG. 10, six still image thumbnails are disposed in two rows in a vertical direction and in three columns in a horizontal direction, and two command buttons are provided under the still image thumbnails. Arrows indicating right and left as viewed in FIG. 10 are displayed on the command buttons. When the left arrow is selected, the menu screen is changed to a menu screen on a previous page, and when the right arrow is selected, the menu screen is changed to a menu screen on a following page (for example, refer to Japanese Patent Application Publication (KOKAI) No. 2003-331526).

Figure 9C:
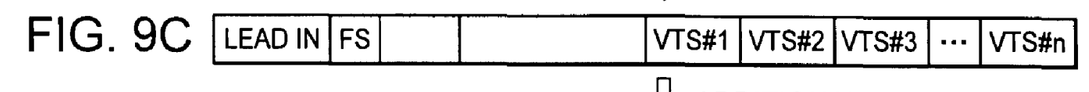
Figure 9D:
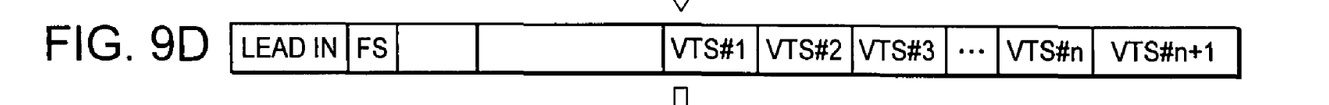

If data is to be written additionally in a DVD disc finalized once, a process called an unfinalizing process is executed. As shown in FIG. 9C, the lead-out, VMGI and VMGM_VOBS are erased from an unfinalized DVD disc. If a DVD disc is unfinalized, data can be written additionally. VTS#n+1 is written additionally in the DVD disc as shown in FIG. 9D.

Figure 9E:
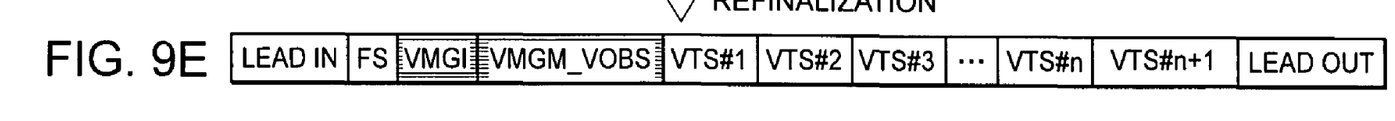

In a case of refinalizing an unfinalized DVD disc, VMGI and VMGM_VOBS are generated again. As shown in FIG. 9E, the generated VMGI and VMGM_VOBS, and a lead-out are recorded in the DVD disc to complete the finalizing process.

As described above, still image thumbnails of VMGM_VOBS are formed by decoding scenes read from a DVD disc, selecting pictures representative of the scenes, and resizing the selected representative pictures. A video pack is formed by repeating generation of still image thumbnails the number of scenes, and encoding again menu screens, bit map data, into a video stream. Since an amount of calculation in a VMGM_VOBS generating process is large, a process time tends to be long. VMGM_VOBS generated at a previous finalizing process and VMGM_VOBS to be generated for refinalizing have a large amount of duplicated data. Therefore, if the whole amount of data is to be generated, there is a wasteful amount of calculation.

SUMMARY OF THE INVENTION

The present invention has been made in view of the above-described issues. According to an embodiment of the present invention, there is provided a recording apparatus and method capable of efficiently generating again screen information for a recording medium for recording image data and screen information on which a screen for selecting image data is based.

In a case of generating screen information of a recording medium again, the recording medium recorded with plural image data, the screen information on which a screen for selecting the plural image data is based, and a recording state of the image data when the screen information was generated, a recording apparatus according to an embodiment of the present invention selects a range of the screen information necessary to be rewritten in accordance with a recording state of image data in the recording medium when previous screen information was generated and a recording state of image data in the recording medium at a present time, and updates only the selected range of the screen information.

A recording method according to an embodiment of the present invention selects, in a case of generating and recording screen information on which a screen for selecting each image data in a recording medium recorded with plural image data is based in the recording medium and additionally writing new image data in the recording medium, a range of the screen information necessary to be rewritten in accordance with a recording state of image data in the recording medium when the screen information was generated and a recording state of image data in the recording medium after the new image data is additionally written, and updates only the selected range of the screen information.

According to the embodiment of the present invention, in a recording medium recorded with screen information on which a screen for selecting the image data is based, in a case of generating the screen information of the recording medium again, a range of the screen information necessary to be rewritten is selected from a recording state of image data in the recording medium when the screen information was generated and a recording state of image data in the recording medium at a present time, and only the selected range of the screen information is updated. Accordingly, the amount of calculation can be reduced more than when whole screen information is generated again and a time required to update the screen information can be shortened.

DETAILED DESCRIPTION

With reference to the accompanying drawings, a video camera to which the present invention is applied will be described. The video camera according to an embodiment of the present invention records photographed images in a DVD disc. Images recorded in the DVD disc are managed in the unit of scene.

A DVD disc to be used for image photographing is a recording type DVD disc. A recording type DVD disc includes DVD-R/RW, DVD+R/RW and the like. If a recording type DVD disc is converted into a DVD-Video format, playback compatibility is realized with a playback-only apparatus.

This process is called finalization. DVD-R and DVD+R are write-once DVD discs so that finalizing can be performed only once. DVD-RW and DVD+RW are rewritable DVD disc so that it is possible to unfinalize the disc, additionally write data and refinalize the disc after finalizing.

In a finalizing process, VMGI (Video Manager Information) which is management information for a DVD disc and VMGM_VOBS (Video Object Set for VMG Menu) on which a menu screen of the DVD disc is based, are generated and recorded in the DVD disc.

When refinalizing is to be performed for a rewritable DVD disc such as DVD+RW and DVD-RW, the video camera to which the present invention is applied judges whether previous finalization was performed by using its own apparatus or another apparatus. If the previous finalization was performed by using its own apparatus, only a necessary portion of data generated at the previous finalization is updated, whereas if the previous finalization was performed by another apparatus, all of the data generated at the previous finalization is generated again.

In addition to a video camera, the present invention is applicable to an electronic apparatus having a recording function such as a DVD recorder and a personal computer equipped with an optical disc drive. In this embodiment, although a DVD is used by way of example, the present invention is applicable to recording media other than DVD.

Figure 1:
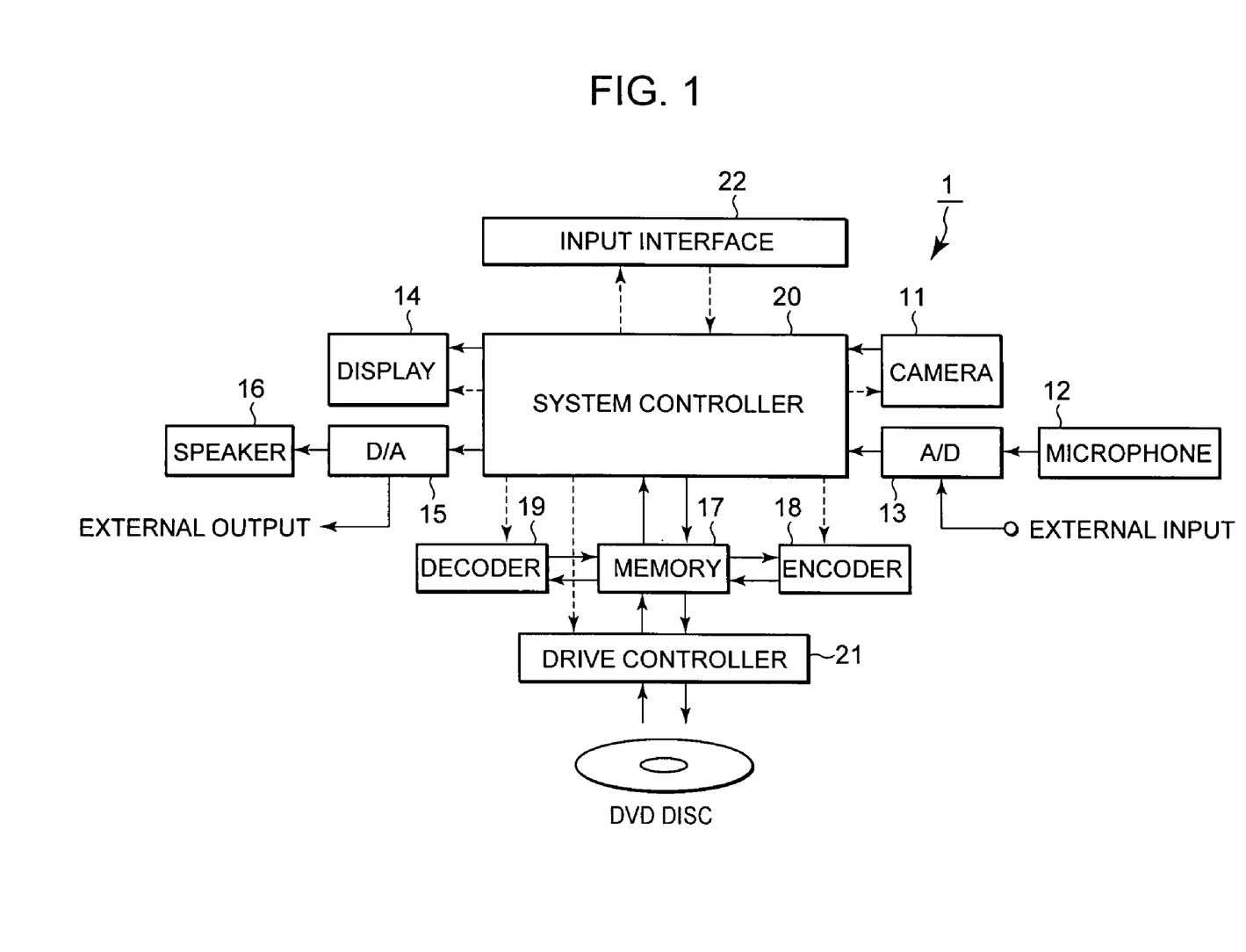
FIG. 1 is a block diagram showing a structure of a video camera to which the present invention is applied.

As shown in FIG. 1, a video camera 1 adopting the present invention has: a camera 11, a microphone 12, and A/D converter 13, a display 14, a D/A converter 15, a speaker, a memory, an encoder 18, a decoder 19, a system controller 20, a drive controller 21 and an input interface 22.

The camera 11 takes moving images. The microphone 12 inputs sounds and voices. The A/D converter 13 converts analog audio data input from the microphone 12 or an external audio apparatus into digital audio data. The display 14 displays images. The D/A converter 15 converts digital audio data into analog audio data. The speaker 16 outputs sounds and voices. The memory 17 is a temporary storage area for data to be processed. The encoder 18 compresses audio/video data and the decoder 19 expands compressed audio/video data. The system controller 20 converts audio/video data into a DVD-Video format. The drive controller 21 writes audio/video data converted into a DVD format in a DVD disc. The input interface 22 receives an input from a user.

Description will be made on a process of recording audio/video data. Video data input from the camera 11 and audio data input from the microphone 12 are stored once in the memory 17. The decoder 19 reads the video data and audio data stored in the memory 17, executes a compression process, and stores the compressed audio/video data in the memory 17. For example, Moving Picture Expert Group (MPEG) is used as the compression method.

The system controller 20 multiplexes the compressed video data and audio data and stores the multiplexed audio/video data in the memory 17. In accordance with an instruction from the system controller 20, the drive controller 21 records the multiplexed audio/video data in a DVD disc.

The process of recording audio/video data in a DVD disc continues until photographing is stopped. The system controller 20 manages the audio/video data recorded during the photographing start to the photographing end, as one scene. One scene corresponds to one chapter of DVD-Video.

The system controller 20 executes a finalizing process for a DVD disc. The finalizing process is a process of converting audio/video data recorded in a DVD disc into a general DVD-Video format and realizing playback compatibility with a playback-only apparatus.

The finalizing process generates VMGI (Video Manager Information) which is management information for a DVD disc and VMGM_VOBS (Video Object Set for VMG Menu) on which a menu screen of the DVD disc is based. The read-out is recorded to prohibit additional recording in a DVD disc. The finalizing process is executed by the system controller 20.

Figure 2:
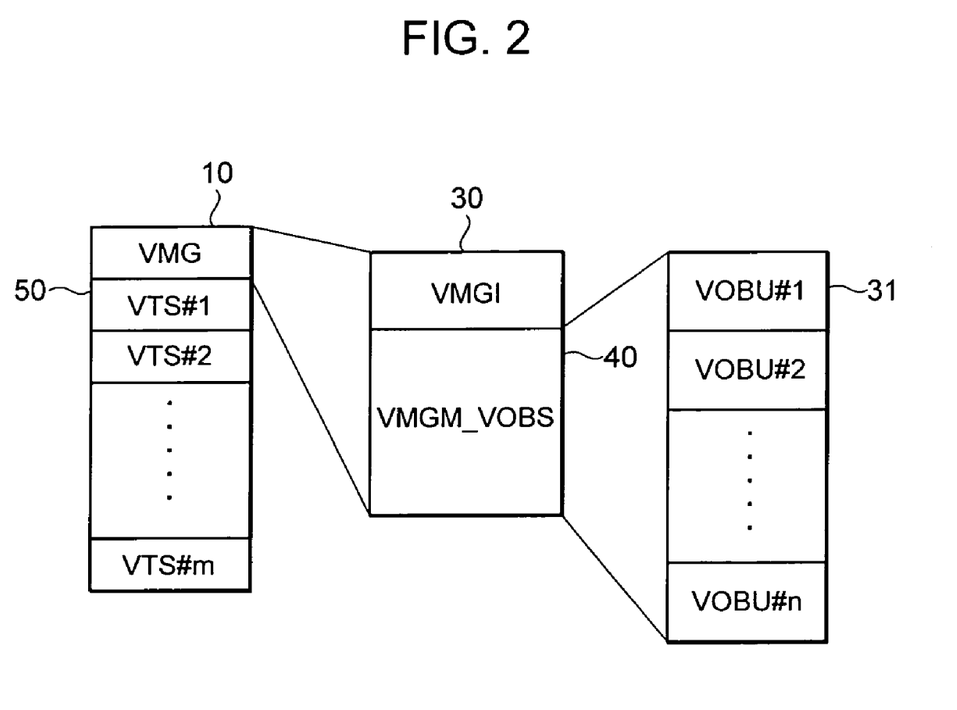
FIG. 2 is a structural diagram showing a video format.

The DVD-Video format will be detailed. As shown in FIG. 2, a DVD disc recorded on the basis of DVD-Video is divided into regions: Video Manager (VMG) 10 and Video Title Set (VTS) 50. An audio video stream of one title is recorded in VTS 50. A plurality of titles can be recorded in DVD-Video. Each title contains a plurality of chapters. In this embodiment, one scene corresponds to one chapter. One scene may correspond to one title.

As shown in FIG. 2, VMGI 30 and VMGM_VOBS 40 are stored in VMG 10. Playback control information for a whole DVD disc is written in VMGI 30. The playback control information includes a pointer to Program Chain (PGC) recording a playback order of audio/video data, a sector number of VMGM_VOBS 40, an attribute of a sub-picture, an attribute of audio/video data and the like.

VOBU 31 on which a menu screen is based is written in VMGM_VOBS 40. The menu screen is a screen for selecting a scene, and a still image thumbnail representative of each scene is attached to the menu screen. The still image thumbnail is linked to a scene. When a still image thumbnail on the menu screen is selected, the scene linked to the selected still image thumbnail is played back.

VMGM_VOBS 40 is constituted of a plurality of VOBUs 31. VOBU 31 corresponds to a menu screen of one page. In this embodiment, the page number of a menu screen is represented by #n (n is an integer). VMGM_VOBS 40 contains n VOBUs 31 from VOBU#1 corresponding to a first page menu screen to VOBU #n corresponding to an n page menu screen.

Figure 3:
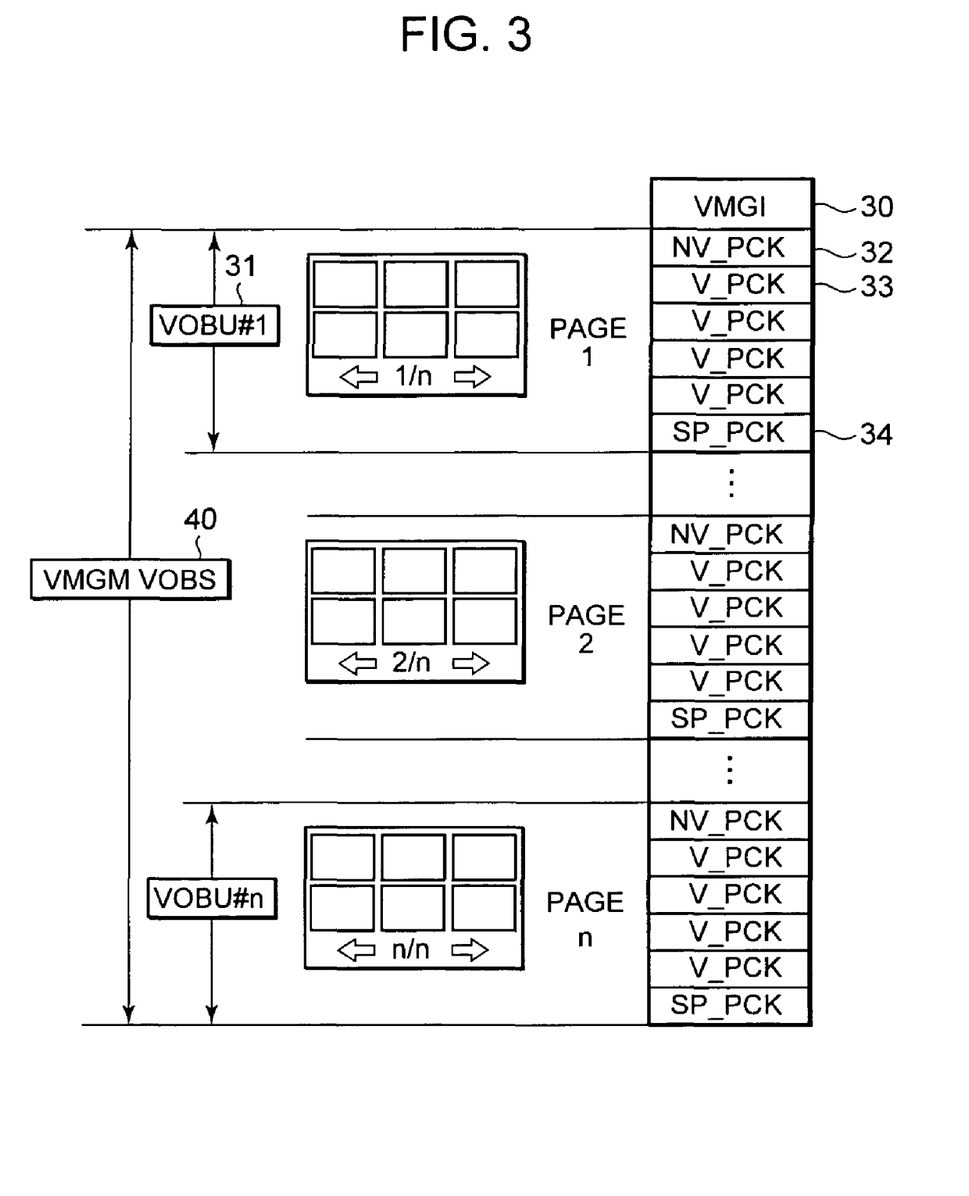
FIG. 3 is a structural diagram showing VOBU.

As shown in FIG. 3, VOBU 31 is a packet obtained by multiplexing three types of recording units into 2 kB (kilobytes), the recording units including a Navigation_Pack (NV_PCK) 32, a Video_Pack (V_PCK) 33 and a SubPicture Pack (SP_PCK) 34.

Playback management information of VOBU 31, command information to be displayed on the menu screen, highlight information and the like are written in the navigation pack 32. The video pack 33 stores a video stream of one still image thumbnail. The sub-picture pack 34 stores a sub-picture stream to be superposed upon the menu screen.

The number of video packs contained in one VOBU 31 is equal to the number of still image thumbnails to be displayed on one menu screen. In the example shown in FIG. 3, one VOBU 31 contains six video packs 33.

Figure 4:
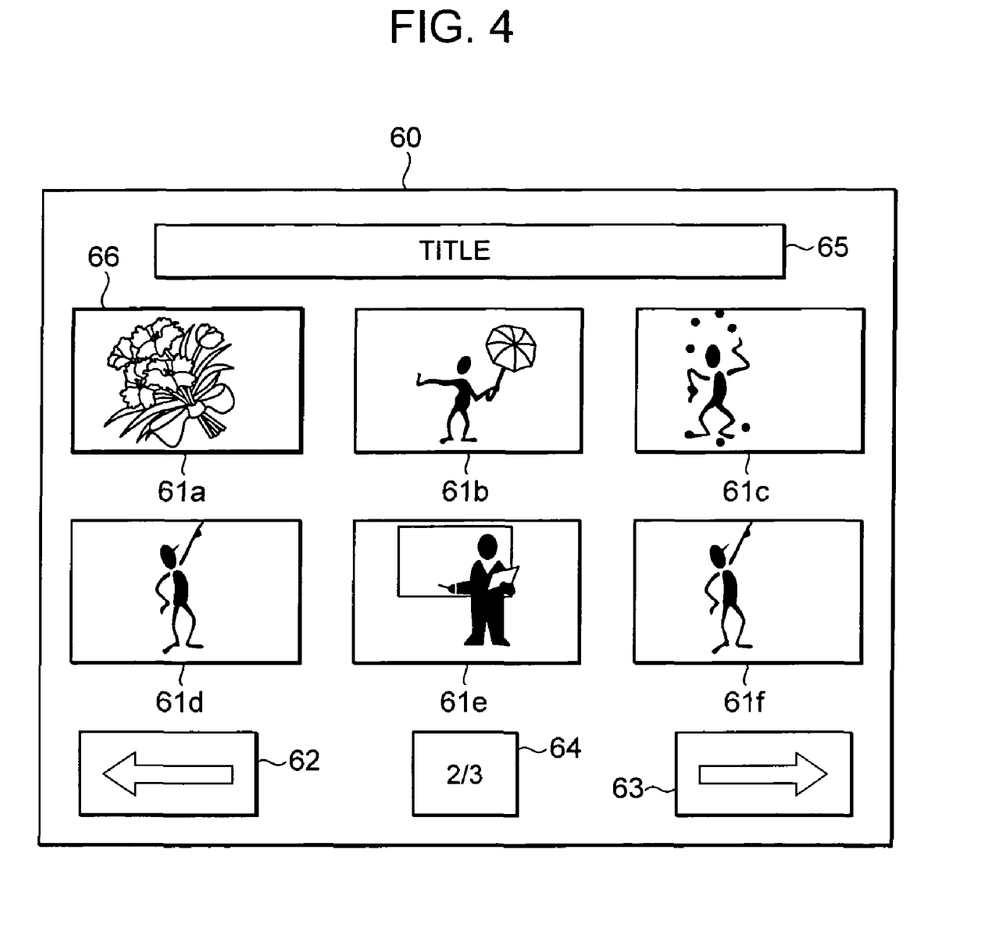
FIG. 4 is a schematic diagram showing an example of a menu screen.

FIG. 4 shows an example of a menu screen. A menu screen 60 shown in FIG. 4 is constituted of six still image thumbnail display areas 61a to 61f, two command buttons 62 and 63, a page number display area 64 and a title display area 65. Still image thumbnails are displayed on the still image thumbnail display areas 61a to 61f. Each still image thumbnail shows a characteristic portion of a scene recorded or to be recorded in a DVD disc.

The menu screen 60 receives an input from the input interface 22. The input interface 22 includes, for example, a cross key for inputting a direction, a selection/execution key for instructing an execution and other keys. A frame width 66 of a selected still image thumbnail becomes wide to emphasize that the thumbnail is being selected presently. If a user operates the input interface 22, a still image thumbnail to be selected changes with a user operation direction. If the user instructs an execution, the system controllers 20 start playing back the scene corresponding to the selected still image thumbnail. In an example shown in FIG. 4, the upper left still image thumbnail is selected, and a width 66 of a frame 61a of this still image thumbnail is made broad. As a method of emphasizing selection/non-selection of a still image thumbnail, a background color may be changed, a display color may be reversed, or the like. The method of emphasizing selection/non-selection is written in the navigation pack 32 as highlight information. Linkage between a still image thumbnail and a corresponding scene is written also in the navigation pack 32.

Two command buttons 62 and 63 are provided under the area of the still image thumbnails. The display position and contents of the command buttons 62 and 63 are described in the navigation pack 32. The contents to be executed when the command button 62 indicating a left direction as viewed in FIG. 4 is selected and the contents to be executed when the command button 63 indicating a right direction as viewed in FIG. 4 is selected, are described in the navigation pack 32. The command buttons 62 and 63 can change the menu screen 60. When the command button 62 indicating the left direction as viewed in FIG. 4 is selected, the system controller 20 reads VOBU 31 describing information regarding to the menu screen on the previous page, and displays the menu screen of the previous page. When the command button 63 indicating the right direction as viewed in FIG. 4 is selected, the system controller 20 reads VOBU 31 describing information with regard to the menu screen the next page, and displays the menu screen of the next page.

The page number display area 64 is positioned between the two command buttons 62 and 63. The title display area 65 is provided in the upper area of the menu screen. A page number displayed in the page number display area 64 and a title displayed in the title display area 65 correspond to the sub-picture. The display position and contents of the sub-picture are described in the sub-picture pack 34.

Figure 5:
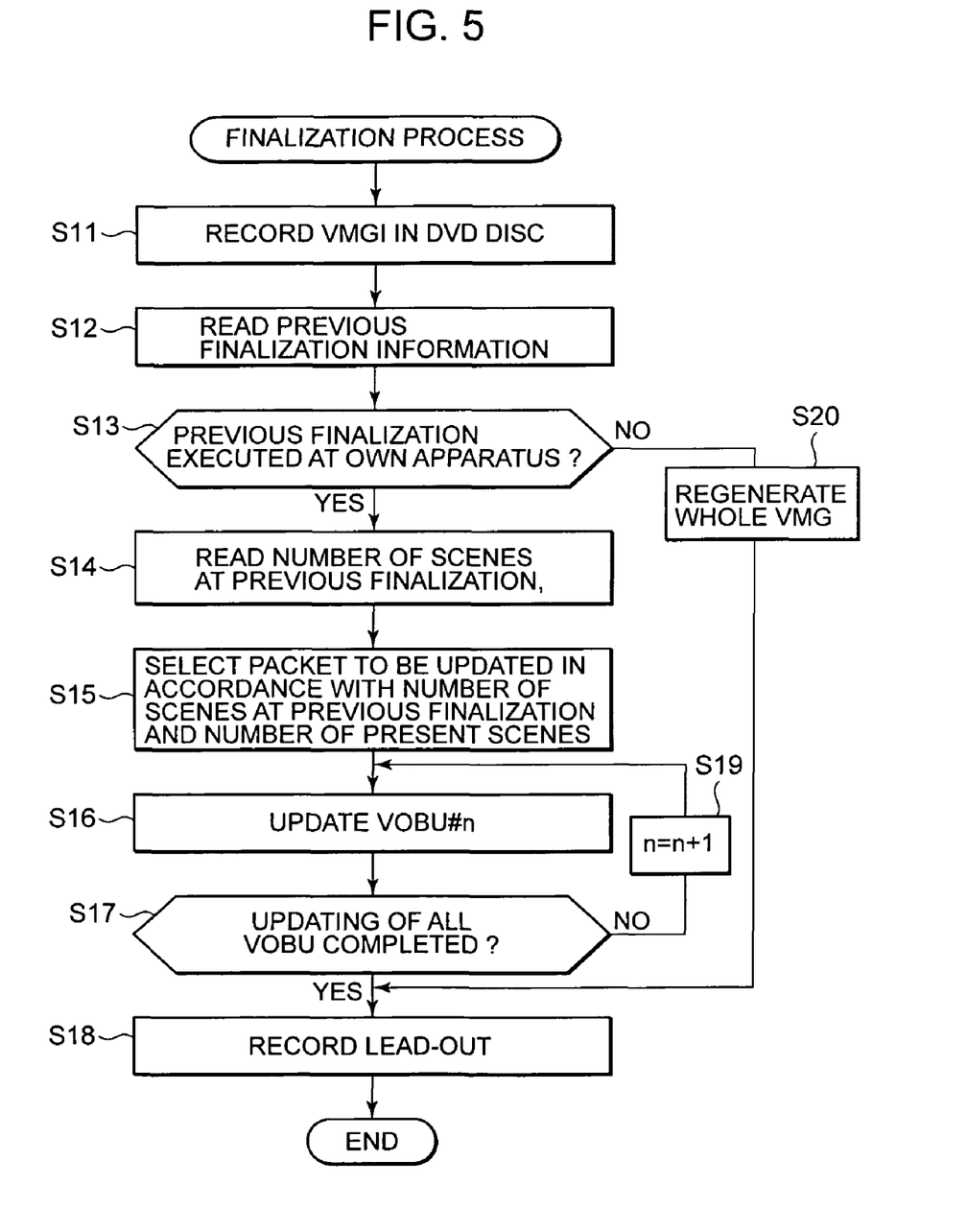
FIG. 5 is a flowchart illustrating steps of a finalizing process.
Figure 6:
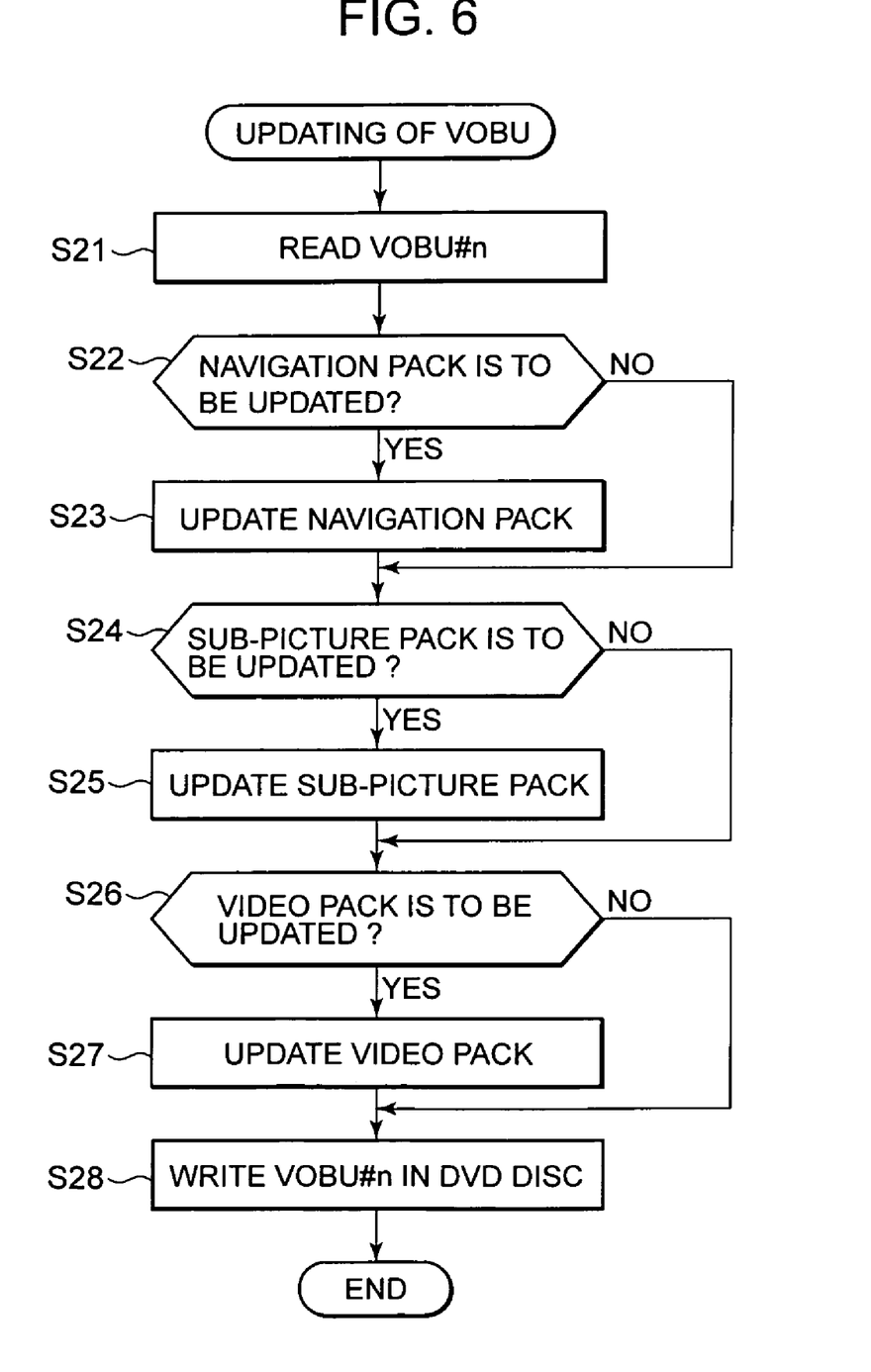
FIG. 6 is a flowchart illustrating steps of a process of updating VOBU.

Next, with reference to FIGS. 5 and 6, description will be made on the finalizing process to be executed by the system controller 20. This finalizing process is a refinalizing process after unfinalizing a DVD disc once finalized and additionally writing some scenes on the DVD disc.

When finalization is instructed by a user, the system controller 20 generates VMGI 30 and stores VMGI 30 in the memory 17. Described in VMGI 30 are sector information and playback sequence information of a DVD disc, and playback control information such as an address of VOBU 31. The drive control unit 21 stores VMGI 30 in the DVD disc (Step S11).

Next, the system controller 20 reads finalization information containing a recording state of the DVD disc at the previous finalization (Step S12). In accordance with the finalization information, the system controller 20 judges whether the configuration of VOBUs generated at the previous finalization is the same as the configuration of VOBUs to be generated at its own apparatus.

In this embodiment, VOBUs are judged, for example, by using model (type) information of an electronic apparatus. In accordance with the finalization information, the system controller 20 judges whether or not the electronic apparatus executed the previous finalization is the same model as that of its own apparatus. In a case where the electronic apparatus executed the previous finalization is the same model as that of its own apparatus, it is conceivable that the configuration of VOBUs is the same as that of VOBUs of its own apparatus.

If the configuration of VOBUs is the same, the number of still image thumbnails to be displayed on the menu screen, the display positions, command types, command execution contents, sub-picture display positions, sub-picture display contents and the like are identical to those of its own apparatus. Namely, in other words, the configuration of the menu screen generated by the electronic apparatus executed the previous finalization is identical to the configuration of the menu screen 20 generated at its own apparatus. In a case where the model of the electronic apparatus executed the previous finalization is the same as that of its own apparatus (YES at Step S13), the system controller 20 reads the number of scenes at the previous finalization from the DVD disc (Step S14).

Figure 7:
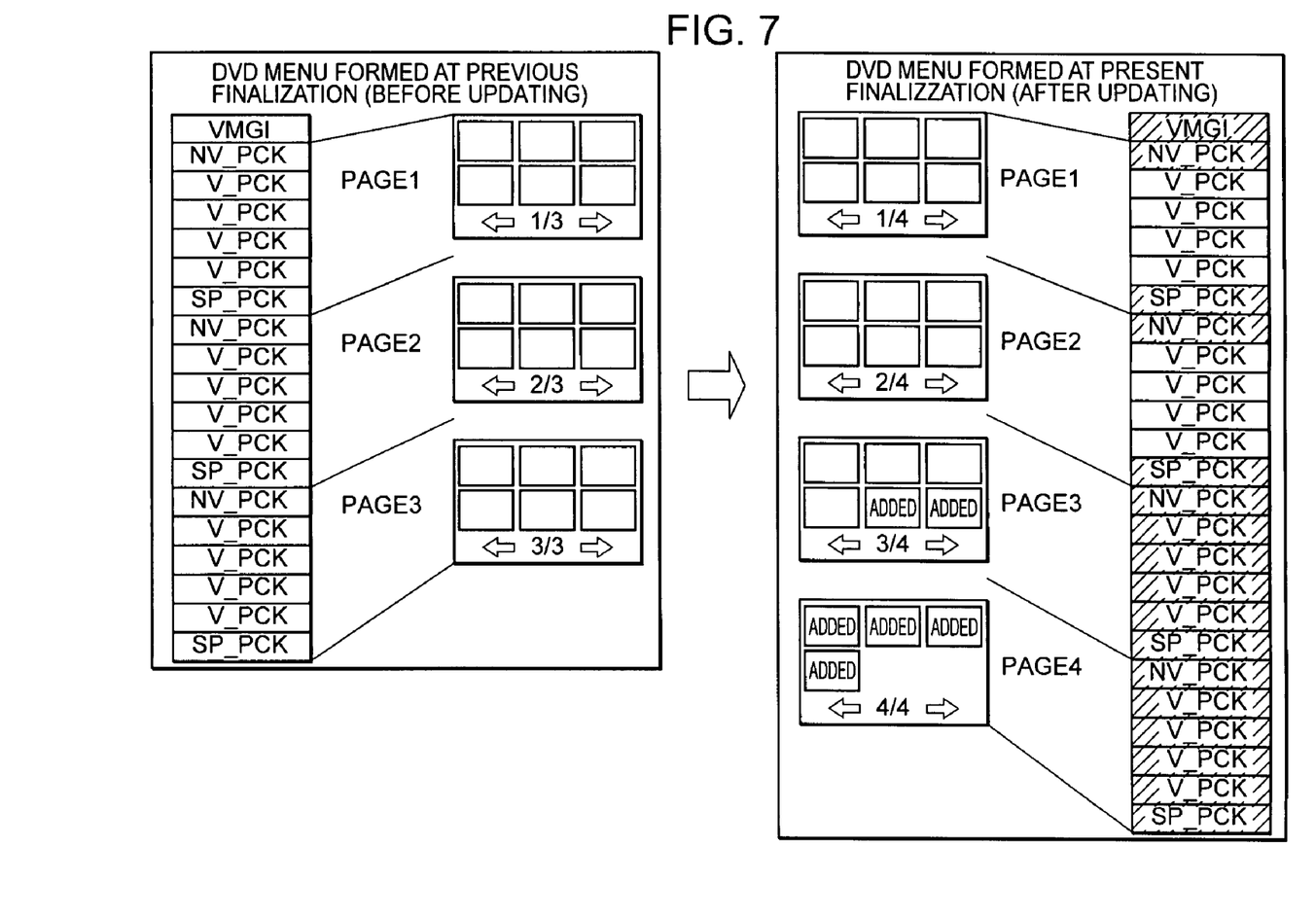
FIG. 7 is a schematic diagram showing a change in VOBU before and after finalizing.

In accordance with the number of scenes at the previous finalization and the number of present scenes, the system controller 20 selects packets necessary to be updated. A selection method will be described in the following. FIG. 7 shows the configurations of VMGs before and after updating. In FIG. 7, packets to be updated are shown hatched. The total number of menu screens before updating is three pages. Six still image thumbnails are displayed on each of the menu screens at first and second pages, and four still image thumbnails are displayed on the menu screen at third page. The total number of still image thumbnails is sixteen before updating. The previous finalization was executed in a state that sixteen scenes were recorded. Six scenes were added before the present finalization.

In the present finalizing process, two still image thumbnails are added to the menu screen at third page, a new menu screen is generated, and four still image thumbnails are displayed the generated menu screen at fourth page.

The system controller 20 judges that the objects to be updated at the present finalization are VOBU#3 to be added with two still image thumbnails and VOBU#4 to be newly added. The system controller 20 also judges that the navigation packs and sub-packs of VOBU#1 and VOBU#2 are to be updated because of addition of the menu screen (Step S15).

The system controller 20 updates VOBUs. VOBUs are updated in the unit of page (Step S16). With reference to FIG. 6, description will be made on a VOBU updating process at Step S16. The system controller 20 reads VOBU#n for one page recorded in the DVD disc (Step S21). If the navigation pack of VOBU#n is to be updated (YES at Step S22), the navigation pack is updated. In updating the navigation pack, management control information for VOBUs, display/non-display of the command buttons, execution contents of the command buttons and the like are updated (Step S23). For example, since two still image thumbnails were added, sector information of these still image thumbnails and the like are added to the navigation pack of VOBU#3. Link information to the menu screen of fourth page and the like are also added.

If the navigation pack of VOBU#n is not to be updated (NO at Step S22), the navigation pack of VOBU#n is not updated.

If the sub-picture pack of VOBU#n is to be updated (YES at Step S24), the system controller 20 updates the sub-picture pack (Step S25). In updating the sub-picture pack, for example, the page number is updated. The number of pages on the menu screen is displayed as "present page number/total number of pages". Since the menu screen is added at the present finalization, the "total number of pages" is rewritten.

If the sub-picture of VOBU#n is not to be updated (NO at Step S24), updating of VOBU#n is not performed.

If the video pack of VOBU#n is to be updated (YES at Step S26), the system controller 20 updates the video pack. The video pack is updated in the unit of VOBU. Namely, if VOBU#n contains at least one video pack to be updated, all video packs stored in VOBU#n are updated.

The video packs of VOBU#3 and VOBU#4 are to be updated. The system controller 20 reads a video stream to be updated, from the DVD disc. The decoder 19 decodes the read video stream. The system controller 20 determines the picture representative of the scene from the decoded video stream, and resizes this picture to a still image thumbnail. The still image thumbnail is stored in the video pack (Step S27). It takes a long time to process a video pack. The video camera 1 adopting the present invention generates only the video pack of VOBU#n which contains an additional scene, a finalization time can be shortened considerably.

If the video pack of VOBU#n is not to be updated (NO at Step S26), the video pack is not updated. After updating of the navigation pack, sub-picture pack and video pack is completed, the system controller 20 writes back the updated VOBU#n to the DVD disc (Step S28). The updating process for VOBU#n is thus completed.

After updating VOBU#n is completed, the system controller 20 checks whether there is a page not yet updated, and if there is a page not yet updated (NO at Step S17), reads the next VOBU#n+1 to repeat the updating process (Step S18). If updating all VOBUs is completed, the lead-out is recorded to terminate the finalization (Step S19).

If it is judged at Step S13 that the model of the electronic apparatus at the previous finalization is different from that of its own apparatus (NO at Step S14), the system controller 20 generates again the whole VMG.

Figure 8A:
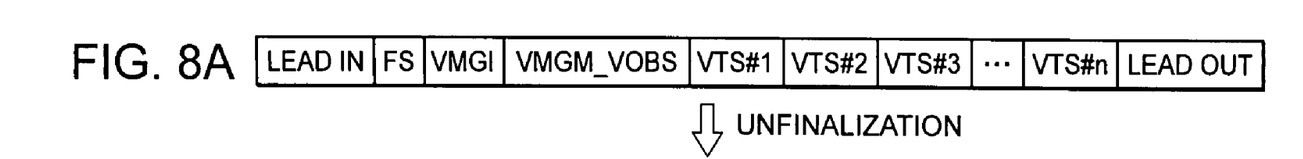
FIGS. 8A to 8D are schematic diagrams showing a change in recorded data in a DVD disc during a finalizing process.

FIGS. 8A to 8D are schematic diagrams showing a change in recorded data during an operation of finalizing again a DVD disc once finalized. In a DVD disc once finalized, a lead-in area, a file system (FS), VMGI, VMGM_VOBS, plural VTSs and a lead-out shown in FIG. 8A are recorded.

Figure 8B:
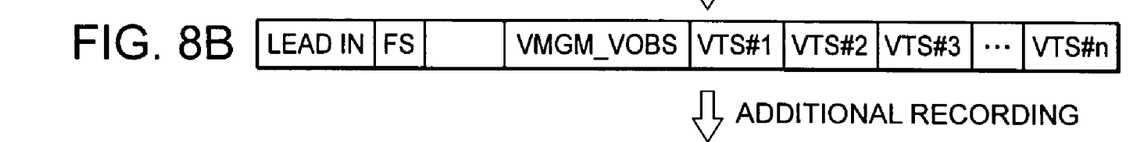
Figure 8C:
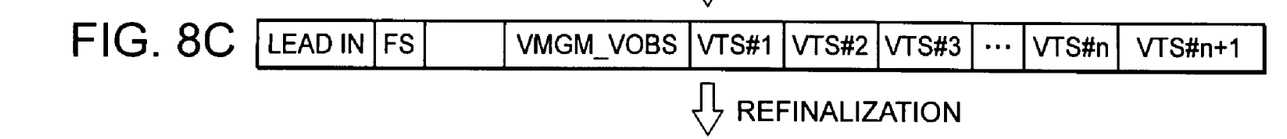

In order to additionally write new data to a finalized DVD disc, first an unfinalizing process is executed to remove the previous finalization. In the finalizing process, the system controller 20 erases the lead-out and VMGI as shown in FIG. 8B. In this case, VMGM-VOBS is not erased but held. It is necessary to add a scene to the unfinalized DVD disc. As shown in FIG. 8C, VTS#n+1 is added.

Figure 8D:
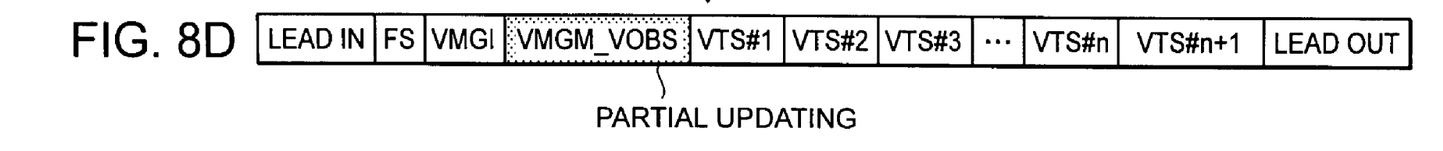

If the previous finalization was executed by an electronic apparatus of the same model as that of its own apparatus, the system controller 20 does not delete VMGM_VOBS but partially update VMGM_VOBS. Finalization information is recorded, including information on a recording state at the finalization such as information on the model of its own apparatus. The system controller 20 writes additionally the lead-out to thereafter terminate the finalization as shown in FIG. 8D.

As described above, if a DVD disc once finalized is to be refinalized, the video camera 1 adopting the present invention judges whether the previous finalization was executed by its own apparatus or another apparatus. If the previous finalization was executed by its own apparatus, only a necessary portion of data generated at the previous finalization is updated.

Finalization for a DVD disc includes a process of generating a menu screen of DVD-Video. The process of generating a menu screen of DVD-Video includes a process of generating still image thumbnails to be attached to the menu screen. The process of generating still image thumbnails includes a process of reading a scene recorded in a DVD disc, decoding the read scene, selecting a representative picture from the decoded scene, and resizing the selected representative picture to the size of a still image thumbnail.

Since the video camera 1 adopting the present invention updates only a portion of VMGM_VOBS necessary to be updated, the number of still image thumbnails to be generated becomes smaller than the whole VMGM_VOBS is generated again.

Since it is judged whether updating is necessary in the unit of packet such as a navigation pack and a sub-picture pack and only packet necessary to be updated, the amount of calculation can be reduced more than updating in the unit of VOBU so that a finalization time can be shortened.

It should be understood by those skilled in the art that various modifications, combinations, sub-combinations and alterations may occur depending on design requirements and other factors insofar as they are within the scope of the appended claims or the equivalents thereof.

The invention claimed is:

1. A recording apparatus, comprising:
   a screen information generation unit that, when again generating screen information of a recording medium recorded with plural image data, the screen information on which a screen for selecting the plural image data is based, and a recording state of the image data when the screen information was generated, selects a range of the screen information necessary to be rewritten in accordance with a recording state of image data in the recording medium when previous screen information was generated and a recording state of image data in the recording medium at a present time, and updates only the selected range of the screen information; and
   a recording control unit for recording screen information generated by the screen information generation unit in the recording medium,
   wherein the recording medium is an optical disc which has been previously subjected to a first finalizing process, and
   wherein during a second finalizing process which occurs after the first finalizing process, the screen information generation unit performs judging operation to determine whether or not tie first finalizing process of the optical disc was performed by a type of recording apparatus which is the same as that of the recording apparatus, and only when a determination result thereof indicates that the type of recording apparatus that performed the first finalizing process is the same as that of the recording apparatus the screen information generation unit causes all Video Object Set for Video Manager Menu (VMGM_VOBS) information recorded on the optical disc to be held and not deleted and causes any necessary updates thereof to be completed.

2. The recording apparatus according to claim 1, wherein a screen generated from the screen information is a menu screen for selecting the image data recorded in the recording medium.

3. The recording apparatus according to claim 2, wherein the optical disc is a DVD disc and the screen information is VMGM_VOBS of a DVD-Video format.

4. The recording apparatus according to claim 3, wherein when a finalized optical disc is to be unfinalized, the image information generation unit deletes only a lead-out and Video Manager Information (VMGI) of the optical disc.

5. The recording apparatus according to claim 3, wherein:
the VMGM_VOBS includes a plurality of VOBUs,
the VOBU is obtained by multiplying recording units including a navigation pack, a sub-picture pack and a video pack, and
the screen information generation unit selects the recording unit necessary to be rewritten.

6. A recording method, comprising:
generating screen information on which a screen for selecting each image data in a recording medium recorded with plural image data, and recording the screen information in the recording medium;
additionally writing new image data in the recording medium; and
selecting a range of the screen information necessary to be rewritten in accordance with a recording state of image data in the recording medium when the screen information was generated and a recording state of image data in the recording medium after the new image data is additionally written, and updating only the selected range of the screen information,
wherein the recording medium is an optical disc which has been previously subjected to a first finalizing process, and
wherein the additionally writing and selecting involves performing a second finalizing process which occurs after the first finalizing process and which includes determining whether or not the first finalizing process of the optical disc was performed by a type of recording apparatus which is the same that of a current recording apparatus currently performing the recording method and only when a determination result thereof indicates that the type of recording apparatus that performed the first finalizing process is the same as that of the current recording apparatus causing all Video Object Set for Video Manager Menu (VMGM_VOBS) information recorded on the optical disc to be held and not deleted and causing any necessary updates thereof to be completed.

7. An apparatus for recording data onto an optical disc which has been previously subjected to a first finalizing process, said apparatus comprising:
means for determining whether the first finalizing process of the optical disc was performed by a type of recording apparatus which is the same as that of the apparatus for recording data; and
means for performing a sec finalizing process which occurs after the first finalizing process on the optical disc in which (i) a lead-out and Video Manager Information (VMGI) of the optical disc are deleted, (ii) all Video Object Set for Video Manager Menu (VMGM_VOBS) information recorded on the optical disc is held and not deleted, and (iii) any necessary additions to the VMGM_VOBS information are recorded on the optical disc along with other information which includes the lead-out, only when a determination result obtained by the means for determining indicates that the type of recording apparatus that performed the first finalizing process is the same as that of the apparatus for recording data.

8. A method for recording data onto an optical disc by use of an apparatus for recording data, in which the optical disc has been previously subjected to a first finalizing process, said method comprising:
determining whether the first finalizing process of the optical disc was performed by a type of recording apparatus which is the same as that of the apparatus for recording data; and
performing a sec finalizing process which occurs after the first finalizing process on the optical disc in which (i) a lead-out and Video Manager Information (VMGI) of the optical disc are deleted, (ii) all Video Object Set for Video Manager Menu (VMGM_VOBS) information recorded on the optical disc is held and not deleted, and (iii) any necessary additions to the VMGM_VOBS information are recorded on the optical disc along with other information which includes the lead-out, only when a determination result indicates that the type of recording apparatus that performed the first finalizing process is the same as that of the apparatus for recording data.

* * * * *